(12) United States Patent
Drake et al.

(10) Patent No.: US 8,223,672 B2
(45) Date of Patent: Jul. 17, 2012

(54) METHOD AND APPARATUS FOR ASSIGNING AND PROVISIONING VOIP SERVICES

(75) Inventors: Peter J. Drake, Mansfield, OH (US); Lisa Kay McLellan, Belton, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1352 days.

(21) Appl. No.: 11/897,732

(22) Filed: Aug. 31, 2007

(65) Prior Publication Data

US 2009/0059817 A1    Mar. 5, 2009

(51) Int. Cl.
*H04M 3/42* (2006.01)
*G06F 15/173* (2006.01)
(52) U.S. Cl. .......... 370/259; 709/222; 709/223; 705/80
(58) Field of Classification Search .......... 370/254, 370/259, 352, 353, 395.53, 230, 331; 709/224, 709/249, 223, 217, 219, 201, 222; 455/406, 455/432.3
See application file for complete search history.

(56) References Cited

U.S. PATENT DOCUMENTS

| | | | |
|---|---|---|---|
| 6,611,867 B1 * | 8/2003 | Bowman-Amuah | 709/224 |
| 7,239,629 B1 * | 7/2007 | Olshansky et al. | 370/353 |
| 7,269,571 B2 * | 9/2007 | Kar | 705/80 |
| 7,400,600 B2 * | 7/2008 | Mullany et al. | 370/331 |
| 7,496,652 B2 * | 2/2009 | Pezzutti | 709/223 |
| 7,729,286 B2 * | 6/2010 | Mishra | 370/254 |
| 8,018,462 B2 * | 9/2011 | Bhogal et al. | 345/473 |
| 2003/0134614 A1 * | 7/2003 | Dye | 455/406 |
| 2005/0074014 A1 * | 4/2005 | Rao et al. | 370/395.53 |
| 2006/0030315 A1 * | 2/2006 | Smith et al. | 455/432.3 |
| 2007/0106801 A1 * | 5/2007 | Jansson | 709/227 |
| 2007/0140215 A1 * | 6/2007 | Lu | 370/352 |
| 2007/0201361 A1 * | 8/2007 | Kumar et al. | 370/230 |
| 2007/0208851 A1 * | 9/2007 | Unkenholz et al. | 709/224 |
| 2008/0183852 A1 * | 7/2008 | Pramer et al. | 709/223 |
| 2009/0222540 A1 * | 9/2009 | Mishra et al. | 709/222 |

* cited by examiner

*Primary Examiner* — Joe Cheng
*Assistant Examiner* — Parth Patel
(74) *Attorney, Agent, or Firm* — Swanson & Bratschun, L.L.C.

(57) ABSTRACT

A method, system, and computer usable program product for assigning and provisioning VOIP services are provided. A data processing system receives an order for the VOIP service and information about virtual inventory. The data processing system may create a provisioning command including provisioning information for provisioning a telecommunication line according to the order and send the provisioning command to a provisioning system, create a porting command including porting information for porting the phone number in the order if porting a phone number and send the porting command to a porting system, create a registration command including user information for registering a user and send the registration command to a web portal, create a setup command including the user information for creating an account for the user and send the setup command to a customer management system. The data processing system may then complete the order for the VOIP service.

27 Claims, 5 Drawing Sheets

METHOD AND APPARATUS FOR ASSIGNING AND PROVISIONING VOIP SERVICES

BACKGROUND

1. Field of the Invention

The principles of the present invention relate generally to an improved telecommunication system, and in particular, to configuring telecommunication services. Still more particularly, the principles of the present invention relate to a method, apparatus, and computer usable program product for assigning and provisioning VOIP services.

2. Description of the Related Art

Telecommunication involves two or more communication devices communicating with each other using a communication network For example, two telephones may be able to communicate with each other using a telecommunication network called public switched telephone network (PSTN. PSTN is primarily a voice telecommunication network for enabling telephone-based telecommunication between two or more parties.

The term "communication devices" describes a collection of all devices used for telecommunication. For example, a communication device can be the familiar telephone, a computer with a telecommunication enabling software application, a telephone-like device that works over data networks instead of a plain old telephone system (POTS) line, a wireless or cellular phone, or any other device used for telecommunication. A communication device is any one of these or other similar devices.

VOIP is a telecommunication method for transmitting voice communications over a data network, such as the Internet. Common VOIP implementations are in telephony where telephone conversations are partly carried over the Internet from a caller telephone to a called telephone. A VOIP call is a voice call connected using VOIP technology. VOIP data is the data that represents the voice signals in a voice call that is connected through VOIP systems.

Data networks are broadly categorized into two categories—local area network (LAM and wide area network (WAN. A LAN is a data network that connects a few data processing systems, generally within a home or an office. A WAN is a data network that connects several LANs and data processing systems together, generally across cities, countries, and continents. The Internet is an example of a WAN, whereas a home networking is an example of a LAN.

Various communication devices are capable of communicating with each other using a variety of networks. Some communication devices are able to communicate over PSTN, other communication devices communicate over wired or wireless LANs and WANs, such as a VOIP enabled telephone. Presently, a communication device capable of communicating on one type of network may be able to communicate with another communication device capable of communicating on another type of network by using intermediate data processing systems for connecting the communication devices operating on dissimilar networks. These intermediate data processing systems are commonly known as gateways, and they bridge different types of networks in the path from a caller communication device to a called communication device.

Several events occur when a user orders a new telephone service. For example, a telephone number is assigned to the user, equipment is installed, and system resources of the telecommunication service provider are provisioned to provide services to the new user and telephone number. A telecommunication service provider, or simply a "provider," is an entity that provides, supports, and services a telecommunication network and other infrastructure to enable communication devices to communicate with each other.

SUMMARY

To reduce the errors and inefficiencies in manual processes used in deploying VOIP services, the illustrative embodiments provide a method, system, and computer usable program product for assigning and provisioning VOIP services. In one embodiment, a data processing system receives an order for the VOIP service. The data processing system also receives information about virtual inventory. The data processing system may create a provisioning command including provisioning information for provisioning a telecommunication line according to the order and sends the provisioning command to a provisioning system. If porting a phone number, the data processing system may create a porting command, including porting information for porting the phone number according to the order, and send the porting command to a porting system. The data processing system may further create a registration command, including user information for registering a user according to the order and send the registration command to a web portal. The data processing system may further create a setup command, including the user information for creating an account for the user according to the order, and send the setup command to a customer management system. The data processing system may then complete the order for the VOIP service.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

Figure 1:
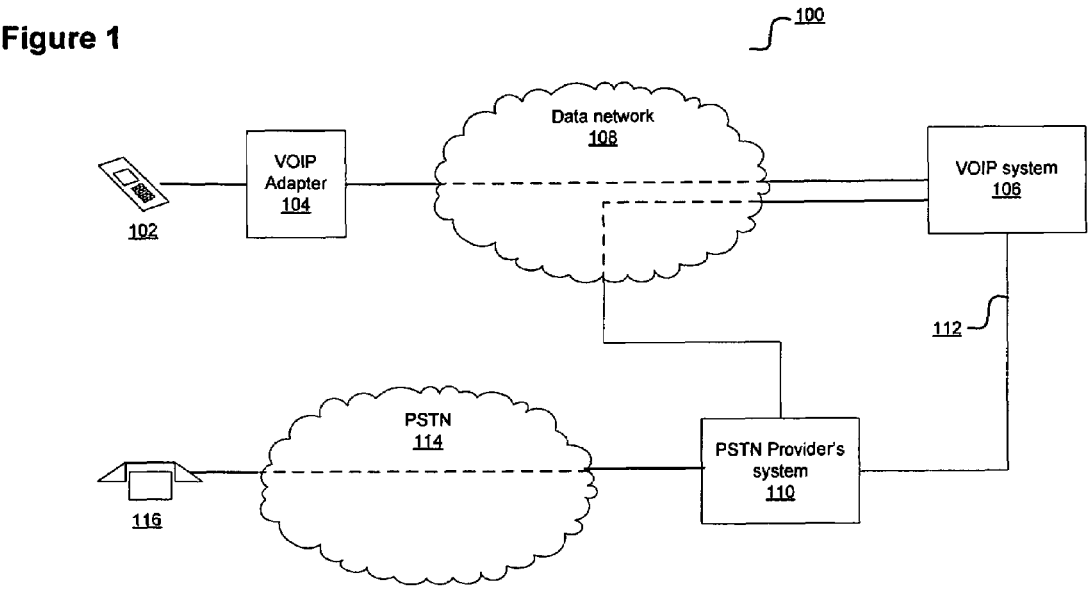
FIG. 1 depicts a block diagram of a telecommunication system in which illustrative embodiments maybe implemented.

A provider typically has a number of systems for supporting new and existing users of telecommunication services. For example, a provider may have a system that manages the user accounts, a system that keeps track of available capacity and resources for adding new users, a system that enables technical support personnel to assist in resolving a problem with telecommunication services, and many other systems.

These systems have been developed, deployed, and used particularly from the point of view of adding and managing PSTN based telecommunication services. A PSTN based telecommunication service is a telecommunication service that uses PSTN equipment and infrastructure for its functioning. PSTN based telecommunication services are also known as PSTN services. Providers have customized these systems to fit their specific product offerings so long as those products have involved PSTN based telecommunication services.

VOIP services have become increasingly popular as an alternative to PSTN based telecommunication services. VOIP services are telecommunication services provided at least in part using VOIP networks. One of the reasons for their popularity is that VOIP telecommunication services appear to the users as virtually indistinguishable from PSTN based telecommunication services from a user's point of view. For example, a VOIP telephone appears to work the same way as a PSTN telephone to a user. For either type of service, the user's equipment, the telephone, is the same, the telephone numbers look and work in the same manner, and the user's actions required for making a call are also the same.

However, the illustrative embodiments recognize that even though the two types of telecommunication services may appear to be similar, the VOIP infrastructure is significantly different from the PSTN infrastructure. For example, where an inventory of PSTN numbers that are available for adding a new user is limited by the physical location of the user, VOIP numbers have no such limitation. A VOIP number associated with one location can be assigned to a user in a completely different location. As another example, PSTN services include service features, such as call-waiting, caller ID, voicemail, call-forwarding, and other common service features, that have to be managed by the provider on behalf of the user. In contrast, the same service features when offered as VOIP service features can be self-managed by the user.

The illustrative embodiments further recognize that the VOIP infrastructure is significantly different from the PSTN infrastructure in the assignment of virtual inventory and the provisioning of the system resources VOIP service. Virtual inventory is an inventory of virtual items that is consumed in configuring a new VOIP service. Telephone numbers available for assignment to the new service is one example of virtual inventory. Data storage space available for assigning to the new service for voicemail and other service features is another example of virtual inventory. Many other similar resources are included in a virtual inventory.

The illustrative embodiments recognize that presently, systems that have been developed and used for assigning and provisioning PSTN telecommunication service are configured on an ad-hoc basis for deploying VOIP telecommunication services. The systems that have been developed and used for assigning and provisioning PSTN telecommunication services are called legacy systems.

The illustrative embodiments further recognize that using PSTN systems for assigning and provisioning VOIP services in this manner involves many manual operations. Especially, the manual operations are presently needed where the systems are incompatible with VOIP methods of assignment and provisioning, or where the systems cannot translate a VOIP order in terms of PSTN order so that a PSTN assignment and provisioning system will understand the VOIP service order correctly. These manual operations can be a source of errors, inaccuracies, delays, and inefficiencies in assigning and provisioning VOIP services. A VOIP order is an order for a new VOIP service, changing an existing VOIP service, or disconnecting a VOIP service. Similarly, a PSTN order is an order for a new PSTN service, changing an existing PSTN service, or disconnecting a PSTN service.

Therefore, the illustrative embodiments provide a method, system, and computer usable program product for assigning and provisioning VOIP services. The method, system, and computer usable program product of the illustrative embodiments may reduce or eliminate one or more manual operations described above. Thus, the method, system, and computer usable program product of the illustrative embodiments may improve the accuracy and efficiency of assigning and provisioning VOIP services in an environment that may include legacy systems.

With reference to the figures, and in particular with reference to FIG. 1, exemplary diagrams of data processing environments are provided in which illustrative embodiments may be implemented. FIG. 1 is not intended to assert or imply any limitation with regard to the environments in which different embodiments may be implemented. Many modifications to the depicted environments may be made.

FIG. 1 depicts a block diagram of a telecommunication system in which illustrative embodiments may be implemented. A telecommunication system 100 includes a phone 102 that may connect to one or more networks. A phone is a communication device. In one embodiment, phone 102 may be a familiar telephone equipment commonly used in homes. In another embodiment, phone 102 may be a software application, such as a soft phone application, running on a data processing system, such as a voice-enabled application running on a computer. In other embodiments, phone 102 may be any other device, system, subsystem, application, or a combination thereof suitable for voice communications.

VOIP adapter 104 is an electronic device that can connect to phone 102, and convert the voice signals to and from phone 102 into data that can be processed for connecting a VOIP call. In one embodiment, phone 102 and VOIP adapter 104 may be combined into one integrated device, forming phone 102.

A VOIP system 106 is representative of the entire VOIP system that a VOIP provider uses for providing VOIP services. VOIP system 106 may include a VOIP gateway and many other systems and equipments, including legacy systems as described above, all of which together enable a VOIP provider to assign, provision, and provide VOIP services. Phone 102 communicates with VOIP system 106 over a data network 108. Data network 108 is a VOIP network as described above. An example of data network 108 is the Internet.

For completing VOIP calls, such as a VOIP call originating from phone 102, VOIP system 106 communicates with providers of regular telephone services, such as PSTN providers, as well as other VOIP providers. FIG. 1 depicts VOIP system 106 in communication with a PSTN provider's PSTN system 110. VOIP system 106 may communicate with PSTN system 110 using a dedicated communication link 112, or using Public data network 108. PSTN provider's system 110 uses a PSTN network 114 for completing the call that originated as a VOIP call from phone 102 to a phone 116. Phone 116 is also a communication device as described above with respect to phone 102. A dedicated communication link such as dedicated communication link 112, is a telecommunication link configured for enabling communication only between predetermined parties.

Likewise, a call originating from phone 116 can be completed at phone 102 by traversing VOIP system 100 in order from phone 116 to phone 102. FIG. 1 depicts only schematic components involved in telecommunication system 100. Several other components, devices, systems, and interconnects may be present in a typical VOIP system but are not shown in FIG. 1 for clarity of the description.

Figure 2:
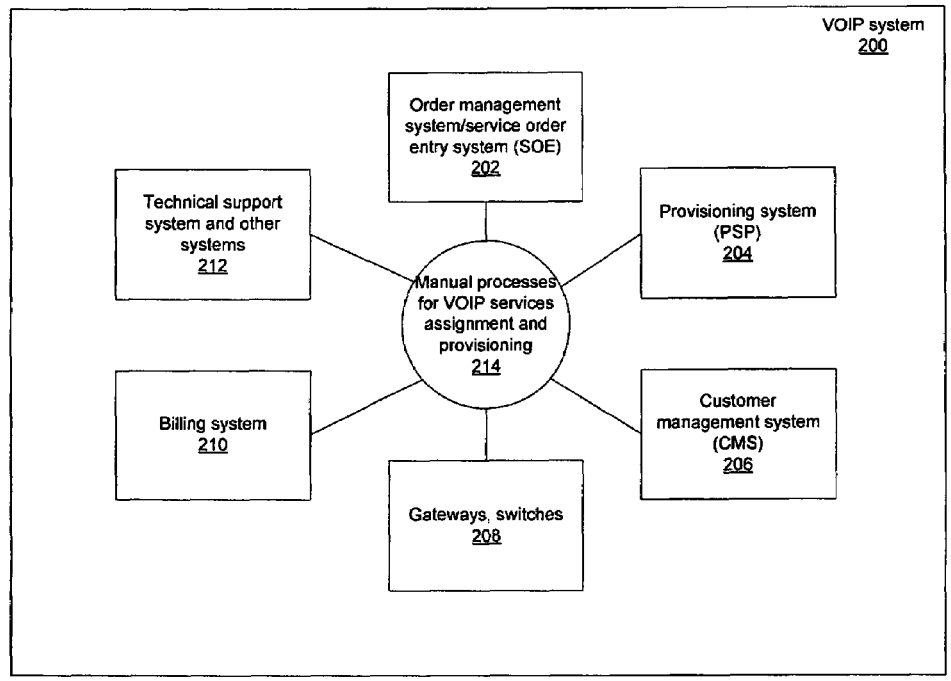
FIG. 2 depicts a block diagram of an exemplary VOIP system as presently used by providers in which the illustrative embodiments maybe implemented.

With reference to FIG. 2, this figure depicts a block diagram of an exemplary VOIP system as presently used by providers in which the illustrative embodiments may be implemented. VOIP system 200 maybe implemented using VOIP system 106 in FIG. 1.

VOIP system 200 includes order management system 202, also known as a service order entry system (SOE). SOE 202 allows a provider to accept orders for new telecommunication services, such as an order for a new VOIP service. Provisioning system (PSP) 204 provisions the provider's resources for a newly ordered telecommunication service. Customer management system (CBS) 206 manages user accounts and information related to the users of the provider's services.

VOIP system 200 further includes gateways and switches 208, which enable VOIP system 200 to communicate with other providers over one or more networks. Billing system 210 may be an accounting system for tracking usage of the provider's services by the users and tracking accounts payable and accounts receivable information. Technical support system and other systems 212 may be other systems in VOIP system 200, or may be a combination of systems, such as SOE 202, PSP 204, CMS 206, etc., that may be used for providing technical support to the users, and other purposes. Note that only a few of the several systems that can exist in a VOIP system are depicted in FIG. 2 for clarity of the description. For example, VOIP system 200 may also include a capacity panning system, an inventory management system, order fulfillment system, and databases.

Furthermore, each of the depicted systems may be a legacy system that a provider may use for assigning and provisioning VOIP services. Manual processes 214 are processes that a provider presently uses for assigning and provisioning VOIP services. For example, SOE 202, a legacy system, may be able to communicate with PSP 204, also a legacy system, for a PSTN order without manual processes 214. The same exemplary legacy systems use manual processes 214 for communicating with each other for assigning and provisioning a VOIP order.

Figure 3:
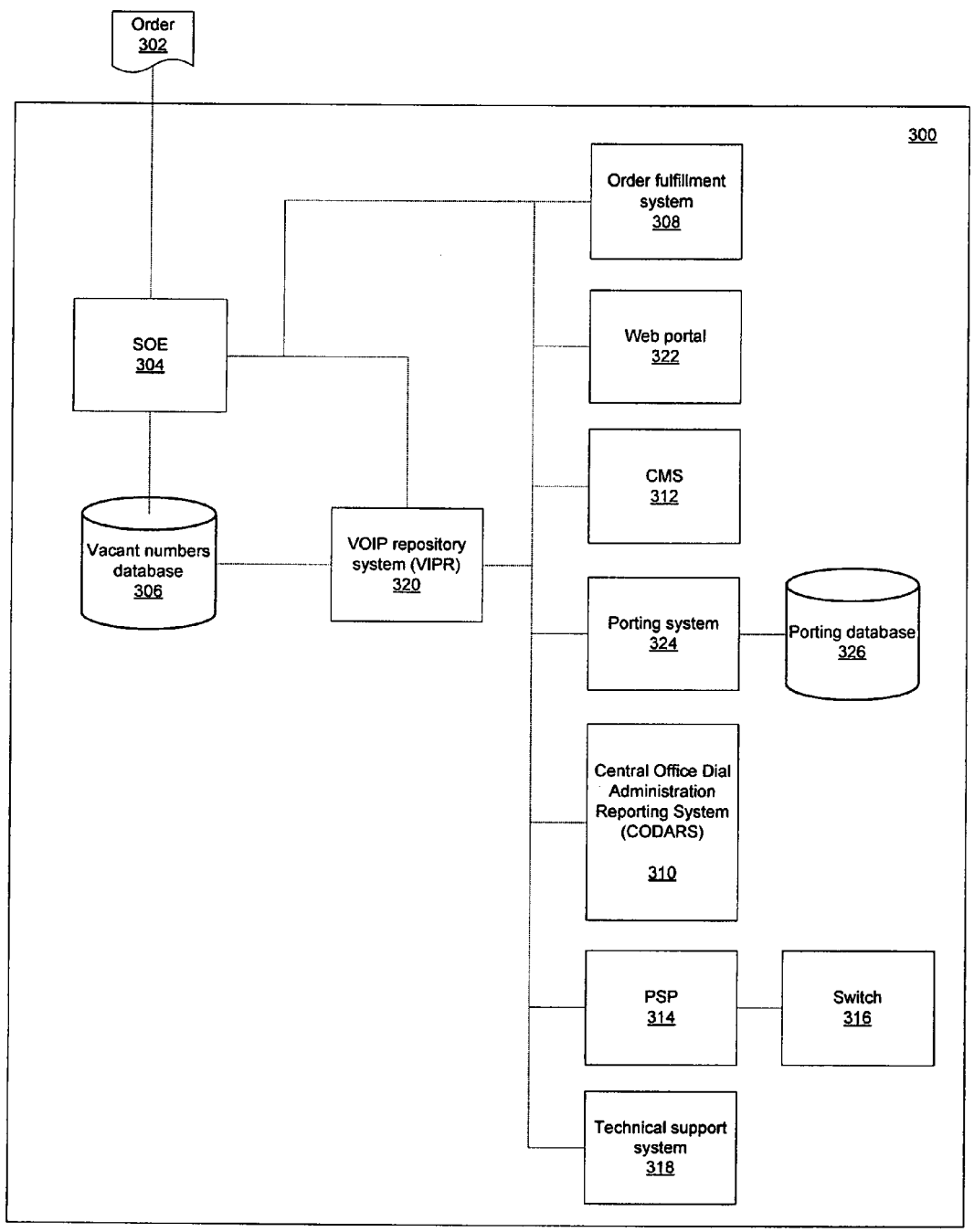
FIG. 3 depicts a block diagram of a VOIP system in accordance with an illustrative embodiment.

With reference to FIG. 3, this figure depicts a block diagram of a VOIP system in accordance with an illustrative embodiment. VOIP system 300 may be implemented using VOIP system 200 in FIG. 2 in conjunction with additional components according to the illustrative embodiments as described below.

Order 302 may be a VOIP order. SOE 304 may be an order management system, such as SOE 202 in FIG. 2. SOE 304 may include a user interface component for order entry, a user interface component for order tracking, a component, such as an order routing system, for distinguishing a PSTN order from a VOIP order and handling the two types of orders accordingly. These and other components are not shown in the high level view of SOE 304.

If order 302 is a PSTN order, legacy SOE 304 may communicate with a legacy vacant number database 306, which is an inventory of available telephone numbers from which to assign a telephone number for order 302. Vacant number database 306 may be a relational database, an object-oriented database, a flat file, an index file, or any other type of data storage suitable for this purpose.

Additionally, when order 302 is a PSTN order, legacy SOE 304 may communicate with order fulfillment system 308 for procuring, shipping, and assigning the equipment needed for the PSTN service according to order 302. Some other exemplary legacy systems that may exist in VOIP system 300 are depicted in FIG. 3. Central office dial administration reporting system (CODARS) 310 is a system that administrates the telephone numbers and network equipment, and manages their records. In one embodiment, CODARS 310 may include vacant number database 306, and may act as the inventory of available telephone numbers as well. CMS 312 may be CMS 206 in FIG. 2. PSP 314 maybe PSP 204 in FIG. 2. PSP 314 may communicate with switch 316, which may be one or more gateways and switches 208 in FIG. 2. Technical support system 318 may be one or more of technical support system and other systems 212 in FIG. 2.

May other legacy systems may exist in VOIP system 300, and many other inter-system interactions may occur when order 302 is a PSTN order. Those other interactions are not depicted, but are readily conceivable from this disclosure.

Furthermore, a legacy system may have one or more components that have been developed for handling VOIP services. Present implementations of interactions between the legacy systems, and their components for handling VOIP services may use manual processes, such as manual processes 214 in FIG. 2.

In accordance with an illustrative embodiment, VOIP repository system 310 (VIPR) facilitates the interactions among various legacy systems, VOIP components of the various legacy systems, and new systems specific to VOIP services. VIPR 320 creates, manages, verifies, supports, coordinates, and tracks such interactions. Furthermore, VIPR 320 facilitates these interactions by creating, using, manipulating, and coordinating data that may exist in various legacy databases and new databases for VOIP services, according to VOIP orders.

For example, VIPR 320 may interact with SOE 304 for receiving order 302, if order 302 is a VOIP order. VIPR 320 may interact with vacant number database 306 for assigning a telephone number to the VOIP service according to order 302. VIPR 320 may interact with order fulfillment system 308 for equipment needed according to order 302.

Continuing with the exemplary interactions, VIPR 320 may interact with web portal 322. Web portal 322 may be a part of a system that supports Internet-based tools that a user may use for configuring and managing their VOIP service. VIPR 320 may interact with CMS 312, such as for creating a new user account for new VOIP service or updating a user's account according to changes in a VOIP service. CMS 312 may be CMS 206 in FIG. 2 and additional components for handling information pertaining to VOIP services.

If order 302 involves porting a telephone number already in use to a VOIP service, VIPR 320 may interact with porting system 324. Porting a telephone number, or simply, porting, is the process of changing the service to an in-use telephone number from one provider to another, or one service type to another. For example, a user may have had a telephone number as a home telephone number for several years with one provider. The user may "port" the telephone number to another provider, thereby changing the provider but keeping the same home telephone number. Similarly, the user may be able to port the telephone number from PSTN service to VOIP service.

Porting system 324 is a system that manages the porting process. As a part of the porting process, porting system 324 may interact with porting database 326, which may track the various telephone numbers being ported, and the stage of porting the porting process may be with respect to each of those telephone numbers. As a part of the porting process, porting system 324 may communicate with other providers' systems as well. Porting system 324 may be a legacy porting system together with additional components for handling information pertaining to VOIP services VIPR 320 may interact with CODARS 310 for administrating and managing records of the VOIP telephone numbers and various network equipment. CODARS 310 may be a legacy CODARS together with additional components for handling information pertaining to VOIP services. In one embodiment, CODARS 310 may include vacant number database 306 and act as the inventory of available telephone numbers that maybe assigned to VOIP services.

VIPR 320 may interact with PSP 314, which may be PSP 204 in FIG. 2 and additional components for handling information pertaining to VOIP services, for provisioning a VOIP service according to order 302. PSP 314 may interact with switch 316, which may also include additional components for handling information pertaining to VOIP services.

VIPR 320 may interact with technical support system 318. Technical support system 318 maybe a legacy technical support system, such as technical support system and other systems 212 in FIG. 2, together with additional components for handling information pertaining to VOIP services.

VIPR 320 may similarly interact with other legacy systems, components handling VOIP information in those legacy systems, or a combination thereof. VIPR 320 facilitated interactions are described in detail with respect to FIGS. 4 and 5 below.

Figure 4:
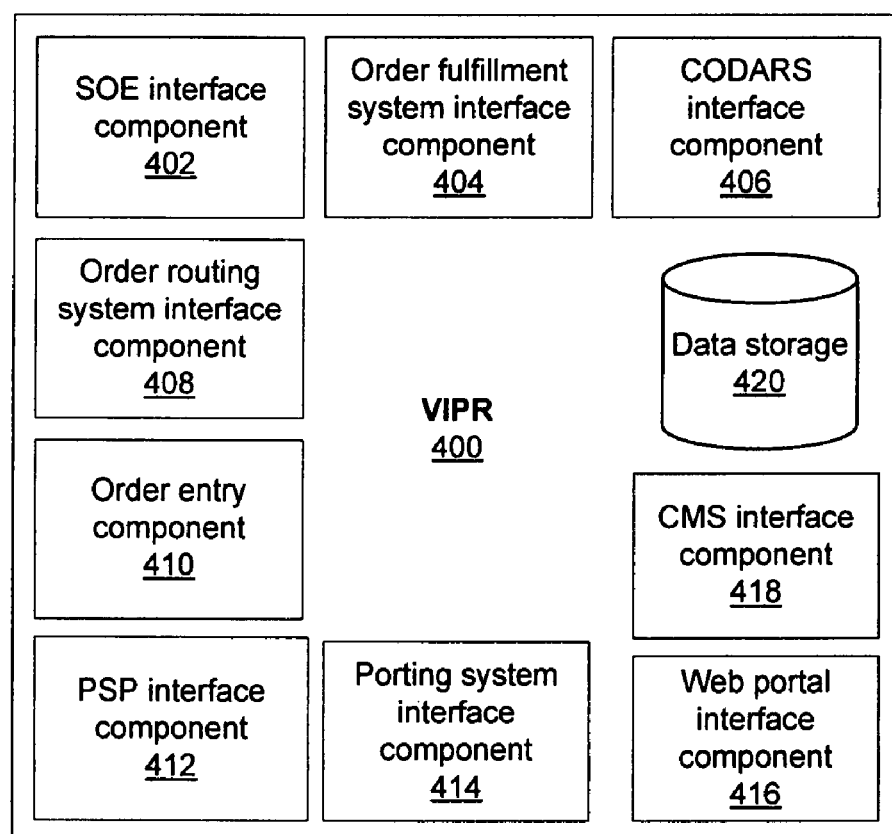
FIG. 4 depicts a component level block diagram of a VOIP repository system (VIPR) in accordance with an illustrative embodiment.

With reference to FIG. 4, this figure depicts a component level block diagram of a VOIP repository system (VIPR) in accordance with an illustrative embodiment. VIPR 400 may be implemented using VIPR 320 in FIG. 3.

VIPR 400 includes several components for interfacing with one or more other systems of a telecommunication provider. The one or more systems of the telecommunication provider may be legacy systems, legacy systems with VOIP components, VOIP systems, or a combination thereof. The several components of VIPR 400 depicted in this figure and described below may be implemented in software, hardware, firmware, or a combination thereof.

VIPR 400 may include SOE interface component 402 for interfacing with an SOE, such as SOE 304 in FIG. 3. Order fulfillment system interface component 404 interfaces with an order fulfillment system, such as order fulfillment system 308 in FIG. 3. CODARS interface component 406 interfaces with CODARS, such as CODARS 310 in FIG. 3. Order routing system interface component 408 interfaces with an order routing system, such as order routing system component of SOE 304 described in FIG. 3. An order routing system maybe a separate system and not a part of the SOE in a particular implementation. In such case, order routing system interface component 408 interfaces with the separate order routing system.

Order entry component 410 maybe an interface and logic for accepting orders form sources other than SOE. For example, order entry component 310 may support a manual order entry process by presenting a graphical user interface for a person to enter orders. PSP interface component 412 interfaces with a PSP, such as PSP 314 in FIG. 3.

Porting system interface component 414 interfaces with a porting system, such as porting system 324 in FIG. 3. In one embodiment, the porting system maybe a national porting database (LSMS). In another embodiment, the porting system may be a system of a provider.

Web portal interface component 416 interfaces with a web portal, such as web portal 322 in FIG. 3. CMS interface component 418 interfaces with a CMS, such as CMS 312 in FIG. 3. Data storage 420 is a storage for data that VIPR or any of its components may utilize for storing data as needed.

Additionally, each component in VIPR 400 may include its own storage space. For example, CODARS interface component 406 may include storage space for duplicating the inventory records from a legacy CODARS that stores the inventory in a form that is not conducive to upload and download to and from VIPR 400. Alternatively, a component, such as CODARS interface component 406, may utilize a combination of a storage space within the component and data storage 420 for storing data.

Figure 5:
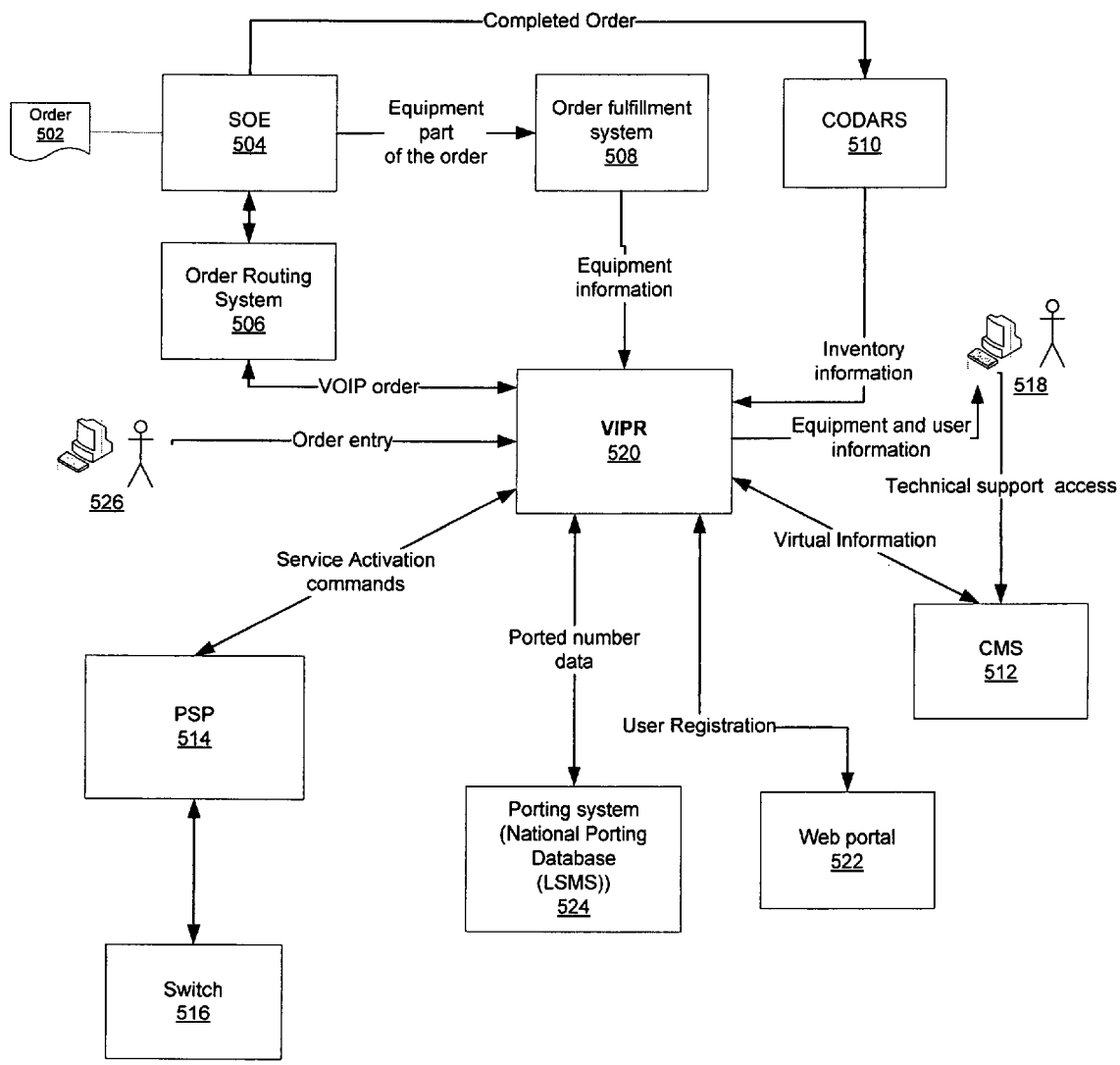
FIG. 5 depicts a block diagram of interactions amongst various legacy systems, VOIP systems, and the VOIP repository system in accordance with an illustrative embodiment.

With reference to FIG. 5, this figure depicts a block diagram of interactions amongst various legacy systems, VOIP systems, and the VOIP repository system in accordance with an illustrative embodiment. Order 502 may be a VOIP order, similar to VOIP order in the form of order 302 in FIG. 3. SOE 504 may be implemented using SOE 304 in FIG. 3. Order routing system 506 may be implemented as a component of SOE 504, or may be a separate system as described above with respect to FIG. 4.

Order fulfillment system 508 may be implemented using order fulfillment system 308 in FIG. 3. CODARS 510 maybe implemented using CODARS 310 in FIG. 3. CM 512 maybe implemented using CMS 312 in FIG. 3. PSP 514 may be implemented using PSP 314 in FIG. 3. Switch 516 maybe implemented using switch 316 in FIG. 3. Technical support access 518 maybe access used by technical support system 318 in FIG. 3, by a technical support person, or both. VIPR 520 may be implemented using VIPR 320 in FIG. 3. Web portal 522 may be implemented using web portal 322 in FIG. 3.

Porting system 524 may be implemented using porting system 324 in FIG. 3. Porting system 524 may or may not include or interact with a database corresponding to porting database 326 in FIG. 3. In one embodiment, the porting system may be a national porting database (LSMS). In another embodiment, the porting system may be a system of a provider. A person or system 526 may perform order entry using VIPR 520.

In operation, SOE 504 receives order 502. SOE 504 may send that information from order 502 that pertains to providing an equipment to fulfill the order to order fulfillment system 508. SOE 504 may send the order to order routing system 506, if the order pertains to VOIP services. SOE 504 may also send all or part of the information from order 502 to CODARS 510 for administrative tasks and updating the inventory.

In one exemplary embodiment, VIPR 520 receives equipment information from order fulfillment system 508. The equipment information may include the serial number, make, model, type, access information, and other similar information about any equipment that the provider may provide for fulfilling order 502.

Continuing with the description of the exemplary embodiment, VIPR 520 receives VOIP order information from order routing system 506. VIPR 520 may receive virtual inventory information from CODARS 510. In one embodiment, VIPR 520 may receive the complete inventory information. In another embodiment, VIPR 520 may receive inventory information limited by some parameter, such as geographical location of the service address in order 502. In another embodiment, VIPR 520 may request a specific virtual item, such as a telephone number, from the inventory and may receive information pertaining to the requested item. In another embodiment, VIPR 520 may periodically receive inventory information, such as on a schedule from CODARS 510 periodically, such as on a schedule. In another embodiment, VIPR 520 may request inventory information from CODARS 510 when VIPR 520 receives an order. Other combinations of the inventory information exchanged between VIPR 520 and CODARS 510 win be conceivable from this disclosure.

VIPR 520 may also accept orders from other order entry systems, and manual order entries from a provider's personnel. Once VIPR 520 receives order information, equipment information, and inventory information, VIPR 520 performs assigning functions for assigning virtual inventory and other resources to the VOIP service being ordered. VIPR 520 also constructs provisioning commands and sends the provisioning commands to PSP 514. Provisioning commands include service activation commands to PSP 514, provisioning information, and information for commands that the PSP may apply to switch 516. PSP 514 includes a provisioning process that uses the commands and information received from VIPR 520 for provisioning a telecommunication line for VOIP service according to order 502. Provisioning information may include but is not limited to identification, type, and amount of provider resources that should be allocated for the telecommunication line according to order 502.

VIPR 520 constructs and sends porting commands to porting system 524, if a telephone number is being ported in order 502. Porting commands instruct porting system 524 to perform the transfer of the telephone number. Porting commands may include porting information, such as old provider, new provider, old type of service, new type of service, authorization for porting, and other information that may be useful in completing the porting operation.

VIPR 520 constructs and sends registration commands to web portal 522. The registration commands instruct web portal 522 to register the user specified in order 502 as a user of the provider's services. A registration command may include user information, for example, a user's name, address, user identifier, features and services ordered, payment information, assigned or ported telephone number, and any other information relevant to the user. Specific implementations of the illustrative embodiments may use different sets of user information with the registration command.

VIPR 520 constructs and sends setup commands to CMS 512. The setup commands instruct CMS 512 to create or modify a user's account with the provider. A setup command may include user information as described above, as well as virtual information, such as a telephone number for the service, an IP address for the VOIP equipment, a listening port for the data from the VOIP equipment, and other similar virtual information pertaining to the service being ordered. A setup command may also include with a setup command information about the equipment, such as an identifier, make, model, type, and other information received by VIPR 520 from order fulfillment system 508.

VIPR 520 may send user and equipment information as described above to a technical support system, if such as system is used. Technical support personnel may use this information in a technical support system for troubleshooting issues with a users service. For example, in one embodiment, the technical support personnel can verify that they have network access to the correct equipment by matching the equipment serial number of the device with which they are in communication, with the equipment serial number associated with a particular user in the technical support system. In another embodiment, a technical support person may access CMS 512 for the user and equipment information for a similar purpose.

VIPR 520 may receive or provide confirmations or acknowledgements in response to the interactions VIPR 520 has with each system Using these confirmations or acknowledgments, VIPR 520 may determine whether the commands sent to the various systems have successfully executed. Upon determining that the commands have successfully executed and completed on the various systems, VIPR 520 may communicate a successful completion of order 502 to one or more of the depicted systems.

VIPR 520 may communicate the successful completion of order 502 to CODARS 510 so that CODARS 510 may update the inventory information. For example, in one embodiment, upon successful completion of order 502, CODARS 510 may reduce the inventory of available telephone numbers by removing the telephone number used for completing order 502. In another embodiment, if VIPR 520 cannot provide an inventory update to CODARS 510, VIPR 520 may similarly update any inventory information that may be within VIPR 520, such as in data storage 420 in FIG. 4. In another embodiment, VIPR 520 may update both, inventory information in CODARS 510, as well as inventory information in VIPR 520, upon completion of an order.

Each of the commands—the provisioning commands, the porting commands, the registration commands, the setup commands, or any combination thereof—can take various forms. In one embodiment, the commands may be in the form of a character string of a specified structure. For example, a command may begin with a few characters identifying the type of command. The command may further include zero or more pieces of data separated by a delimiter or by fixed lengths of the data. The command may terminate with a terminator or by a fixed length of the command.

In another embodiment, the command may be a structured document which follows a predefined structure. The data and command information may be embedded in the structured document according to the predefined structure. For example, the command may be in the form of an extensible markup language (XML) document. Many other ways of constructing or structuring the described commands will become apparent from this disclosure. Such ways of constructing or structuring the commands, or structuring the commands, are contemplated within the scope of the illustrative embodiments.

VIPR 520 may interact with additional systems not shown here based on a particular implementation of the illustrative embodiments. Furthermore, the interactions, the information, and the commands as described above may be combined, further subdivided, omitted, or augmented to in a particular implementation without departing from the scope or spirit of the illustrative embodiments.

Figure 6:
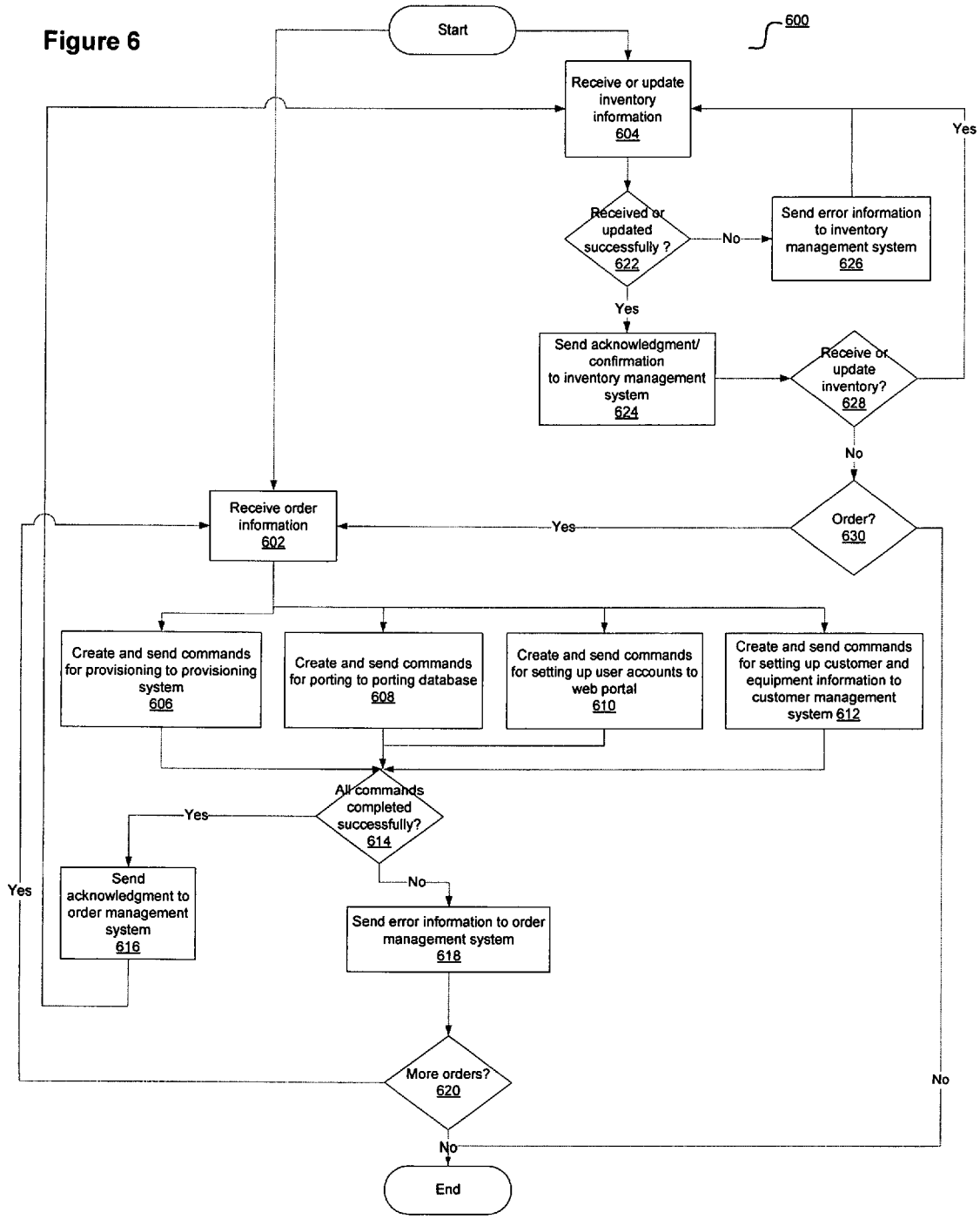
FIG. 6 depicts a flowchart of a process of assigning and provisioning a VOIP service in accordance with an illustrative embodiment.

With reference to FIG. 6, this figure depicts a flowchart of a process of assigning and provisioning a VOIP service in accordance with an illustrative embodiment. Process 600 may be implemented in VIPR 520 in FIG. 5.

Process 600 begins by receiving order information (step 602). Process 600 may also begin by receiving inventory information (step 604). As described with respect to FIG. 5, VIPR, such as VIPR 520 in FIG. 5, may receive inventory information from CODARS, such as CODARS 510 in FIG. 5, periodically or upon receiving an order. Process 600 begins at step 602 when the process receives inventory information upon receiving an order. Process 600 begins at step 604 when the process receives the inventory information periodically. The following description first describes process 600 when the process starts at step 602. Next, the description describes process 600 when the process starts at step 604.

Starting at step 602, the process creates and sends several commands to several systems. For example, the process creates and sends commands to a provisioning system, such as PSP 514 in FIG. 5 (step 606). Continuing with the example, the process also creates and sends commands to a porting system, such as PSP 514 in FIG. 5 (step 608). The process also creates and sends commands to a web portal, such as web portal 522 in FIG. 5 (step 610). The process also creates and sends commands to a customer management system, such as CMS 512 in FIG. 5 (step 612). The commands described here are chosen only as exemplary and are not limiting on the illustrative embodiments. Process 600 may create and send additional or fewer commands in particular implementations of the illustrative embodiments. For example, process 600 may additionally create and send commands to a technical support system, such as technical support system 318 in FIG. 3.

Process 600 determines whether each command sent from process 600 has completed successfully (step 614). If all commands have successfully completed, as may be reflected in confirmations that the process may receive from the various systems, ("Yes" path of step 614), the process may send an acknowledgment or a confirmation of completion of the order to an order management system, such as SOE 504 (step 616).

Note that in one embodiment, some or all systems may not send any confirmation or acknowledgment of command completion. The process may determine that commands sent to such systems have been completed by other techniques. In another embodiment, the process may send an acknowledgment or confirmation of order completion to an order routing system, such as order routing system 506 in FIG. 5. In another embodiment, the process may not send any acknowledgment or confirmation of order completion to any system, and the relevant systems may determine that the order has been completed by other implementation specific methods.

Following step 616, the process updates the inventory information (step 604). The process then proceeds again from either step 602 or step 604 as described above. In one embodiment, the process may end after step 616.

Returning to step 614, if the process determines that one or more commands have not successfully completed, ("No" path of step 614), the process may send error information to the order management system (step 618). In one embodiment, the process may send the error information to an order routing system. In another embodiment, the process may not send any error information to any system and the appropriate systems may determine the error by alternate implementation specific methods.

Following step 618, the process determines if more orders are to be processed (step 620). If more orders are to be processed, ("Yes" path of step 620), the process returns to step 602 and proceeds as described above. If no more orders are to be processed, ("No" path of step 620), the process ends. In one embodiment, the process may not end if no orders are to be processed, but may return to step 604 and receive or update inventory information.

Process 600 may also begin by receiving or updating inventory information (step 604). The process may receive complete inventory information, an update to complete inventory information previously received, incremental updates to complete or partial inventory information received previously, or any combination thereof, in step 604.

When the process begins from step 604, or reaches step 604 while performing the steps reached when the process receives an order in step 602, the process determines if the inventory information was received or updated successfully (step 622). If the inventory information was successfully received or updated, ("Yes" path of step 622), the process may send an acknowledgment or confirmation to the inventory management system, such as to CODARS 510 in FIG. 5 (step 624). If, however, the inventory information was not successfully received or updated, ("No" path of step 622), the process may send error information to the inventory management system (step 626). Note that process 600 may not send any acknowledgment or confirmation of step 624, or the error information of step 626, to an inventory management system in a particular implementation.

Following step 624, the process determines if inventory information should be received or updated again, such as when a time period for an update has elapsed (step 628). If the inventory information should be received or updated again, ("Yes" path of step 628), the process returns to step 604. If inventory information is not to be received or updated again, the process may determine if there are any orders to process (step 630). If there are orders to be processed, ("Yes" path of step 630), the process proceeds to step 602 and follows the processing described above. If there are no orders to be processed, ("No" path of step 630), the process ends.

Note that the steps of process 600 are selected and described only for clarity of the description and are not limiting on the illustrative embodiments. Depicted steps may be combined, further divided, augmented to, deleted, or modified in particular implementations.

Thus, in the illustrative embodiments described above, a computer implemented method, apparatus, and computer program product provide for assigning and provisioning VOIP services. The illustrative embodiments describe an improved telecommunication system where a legacy systems, legacy systems with VOIP components, or new systems for VOIP services may be able to interact with each other with reduced or no manual processes for assigning and provisioning VOIP services. The method, apparatus, and computer usable program product of the illustrative embodiments may reduce or remove the potential for errors and inefficiencies associated with the presently used manual processes.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM, a rigid magnetic disk, and an optical disk Current examples of optical disks include compact disk—read-only memory (CD-ROM, compact disk—read/write (CD-R/W, and DVD.

Further, a computer storage medium may contain or store a computer-readable program code such that when the computer-readable program code is executed on a computer, the execution of this computer-readable program code causes the computer to transmit another computer-readable program code over a communication link This communication link may use a medium that is, for example, without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for assigning and provisioning a VOIP service, the method comprising:

receiving, in a data processing system, an order for the VOIP service;

receiving, in the data processing system, information about virtual inventory, the virtual inventory including virtual items that are used in configuring a new VOIP service;

creating, in the data processing system, a provisioning command including provisioning information for provisioning a telecommunication line according to the order;

sending, from the data processing system, the provisioning command to a provisioning system;

creating, in the data processing system, if porting a phone number, a porting command including porting information for porting the phone number according to the order;

sending, from the data processing system, the porting command to a porting system;

creating, in the data processing system, a registration command including user information for registering a user according to the order;

sending, from the data processing system, the registration command to a web portal;

creating, in the data processing system, a setup command including the user information for creating an account for the user according to the order;

sending, from the data processing system, the setup command to a customer management system; and completing, in the data processing system, the order for the VOIP service.

2. The method of claim 1, further comprising:

updating, in the data processing system, the information about virtual inventory, wherein the update corresponds to assigning and provisioning the VOIP service according to the order.

3. The method of claim 1, further comprising:

updating, in a source of the information about virtual inventory, the information about virtual inventory, wherein the update corresponds to assigning and provisioning the VOIP service according to the order.

4. The method of claim 1, wherein the setup command further includes an equipment identifier associated with an equipment corresponding to the order.

5. The method of claim 4, wherein the customer management system uses the equipment identifier to verify network access to the equipment.

6. The method of claim 1, wherein the provisioning system applies the provisioning command to a switch.

7. The method of claim 1, wherein the information about virtual inventory is received one of periodically and after receiving the order.

8. The method of claim 1, wherein at least one of the provisioning command, the porting command, the registration command, and the setup command is a character string.

9. The method of claim 1, wherein the completing the order includes confirming, from the data processing system, if each of the provisioning command, the porting command, the registration command, and the setup command has been completed.

10. A system for assigning and provisioning a VOIP service, the system comprising:

a VOIP repository system, the VOIP repository system configured to receive each of an order for the VOIP service and information about virtual inventory, the virtual inventory including virtual items that are used in configuring a new VOIP service, the VOIP repository system further configured to create a provisioning command including provisioning information for provisioning a telecommunication line according to the order and sending the provisioning command to a provisioning system, if porting a phone number, the VOIP repository system further configured to create a porting command including porting information for porting the phone number according to the order and sending the porting command to a porting system, the VOIP repository system further configured to create a registration command including user information for registering a user according to the order and to send the registration command to a web portal, the VOIP repository system further configured to create a setup command including the user information for creating an account for the user according to the order and to send the setup command to a customer management system, and the VOIP repository system further configured to complete the order for the VOIP service.

11. The system of claim 10, further including the VOIP repository system further configured to update, in the VOIP repository system, the information about virtual inventory, wherein the update corresponds to assigning and provisioning the VOIP service according to the order.

12. The system of claim 10, further including the VOIP repository system further configured to update, in a source of the information about virtual inventory, the information about virtual inventory, wherein the update corresponds to assigning and provisioning the VOIP service according to the order.

13. The system of claim 10, wherein the setup command further includes an equipment identifier associated with an equipment corresponding to the order.

14. The system of claim 13, wherein the customer management system uses the equipment identifier to verify network access to the equipment.

15. The system of claim 10, wherein the provisioning system applies the provisioning command to a switch.

16. The system of claim 10, wherein the information about virtual inventory is received one of periodically and after receiving the order.

17. The system of claim 10, wherein at least one of the provisioning command, the porting command, the registration command, and the setup command is a character string.

18. The system of claim 10, wherein the VOIP repository system completing the order includes the VOIP repository system confirming if each of the provisioning command, the porting command, the registration command, and the setup command has been completed.

19. A computer usable program product in a non-transitory computer readable medium storing computer executable instructions for assigning and provisioning a VOIP service that, when executed, cause a data processing system to:

receive, in the data processing system, an order for the VOIP service;

receive, in the data processing system, information about virtual inventory, the virtual inventory including virtual items that are used in configuring a new VOIP service;

create, in the data processing system, a provisioning command including provisioning information for provisioning a telecommunication line according to the order;

send, from the data processing system, the provisioning command to a provisioning system create, in the data processing system, if porting a phone number, a porting command including porting information for porting the phone number according to the order;

send, from the data processing system, the porting command to a porting system;

create, in the data processing system, a registration command including user information for registering a user according to the order;

send, from the data processing system, the registration command to a web portal;

create, in the data processing system, a setup command including the user information for creating an account for the user according to the order;

send, from the data processing system, the setup command to a customer management system; and complete, in the data processing system, the order for the VOIP service.

20. The computer usable program product of claim 19, further comprising instructions that, when executed cause the data processing system to update, in the data processing system, the information about virtual inventory, wherein the update corresponds to assigning and provisioning the VOIP service according to the order.

21. The computer usable program product of claim 19, further comprising instructions that, when executed cause the data processing system to:

update, in a source of the information about virtual inventory, the information about virtual inventory, wherein the update corresponds to assigning and provisioning the VOIP service according to the order.

22. The computer usable program product of claim 19, wherein the setup command further includes an equipment identifier associated with an equipment corresponding to the order.

23. The computer usable program product of claim 22, wherein the customer management system uses the equipment identifier to verify network access to the equipment.

24. The computer usable program product of claim 19, wherein the provisioning system applies the provisioning command to a switch.

25. The computer usable program product of claim 19, wherein the information about virtual inventory is received one of periodically and after receiving the order.

26. The computer usable program product of claim 19, wherein at least one of the provisioning command, the porting command, the registration command, and the setup command is a character string.

27. The computer usable program product of claim 19, wherein the completing the order includes confirming, from the data processing system, if each of the provisioning command, the porting command, the registration command, and the setup command has been completed.

* * * * *